United States Patent [19]
Klish

[11] Patent Number: 6,014,708
[45] Date of Patent: Jan. 11, 2000

[54] ADAPTOR AND METHOD FOR MAPPING A FAST ETHERNET PAYLOAD INPUT SIGNAL TO A SYNCHRONOUS PAYLOAD ENVELOPE, AS WELL AS A CLOCK SELECTOR FOR USE THEREWITH

[75] Inventor: Cypryan T. Klish, Raleigh, N.C.

[73] Assignee: Alcatel, Paris, France

[21] Appl. No.: 09/025,923

[22] Filed: Feb. 19, 1998

[51] Int. Cl.⁷ .................................................. G06F 13/00
[52] U.S. Cl. ........................ 709/232; 709/236; 709/250; 370/465; 370/907
[58] Field of Search .................................. 709/230, 231, 709/232, 233, 236, 246, 250, 300, 301; 370/465, 466, 470, 474, 907, 910

[56] References Cited

U.S. PATENT DOCUMENTS

| | | | |
|---|---|---|---|
| 4,320,520 | 3/1982 | Graham | 375/275 |
| 4,800,559 | 1/1989 | Florea et al. | 370/402 |
| 4,933,937 | 6/1990 | Konishi | 370/404 |
| 4,953,180 | 8/1990 | Fieschi et al. | 375/219 |
| 5,134,612 | 7/1992 | Yoshimura | 370/545 |
| 5,208,831 | 5/1993 | Ueno et al. | 375/220 |
| 5,214,650 | 5/1993 | Renner et al. | 370/276 |
| 5,231,495 | 7/1993 | Kaneko et al. | 348/721 |
| 5,247,518 | 9/1993 | Takiyasu et al. | 370/416 |
| 5,249,183 | 9/1993 | Wong et al. | 370/228 |
| 5,291,485 | 3/1994 | Afify et al. | 370/476 |
| 5,355,362 | 10/1994 | Gorshe et al. | 370/222 |
| 5,410,535 | 4/1995 | Yang et al. | 713/1 |
| 5,412,651 | 5/1995 | Gorshe | 370/412 |
| 5,461,622 | 10/1995 | Bleickardt et al. | 370/470 |
| 5,471,476 | 11/1995 | Hiramoto | 370/516 |
| 5,548,620 | 8/1996 | Rogers | 375/354 |
| 5,568,486 | 10/1996 | Huscroft et al. | 370/395 |
| 5,572,515 | 11/1996 | Williamson et al. | 370/252 |
| 5,600,650 | 2/1997 | Oskouy | 370/468 |
| 5,623,512 | 4/1997 | Sasaki | 375/211 |
| 5,633,892 | 5/1997 | Krisher | 375/286 |
| 5,771,237 | 6/1998 | Kao | 370/463 |
| 5,892,768 | 4/1999 | Jeng | 370/445 |
| 5,922,052 | 7/1999 | Heaton | 709/223 |

*Primary Examiner*—Viet D. Vu
*Attorney, Agent, or Firm*—Ware, Fressola, Van Der Sluys & Adolphson LLP

[57] ABSTRACT

Under-utilization of payload capacity of SONET/SDH SPE/VC when transporting 100 Mbps fast ethernet is avoided by providing a fast ethernet that is exactly compatible with ISO/IEC 8802-3 (ANSI/IEEE Standard 802.3), except that it is operated at 150 Mbps rather than 100 Mbps. At 150 Mbps, the payload capacity can be filled.

3 Claims, 4 Drawing Sheets

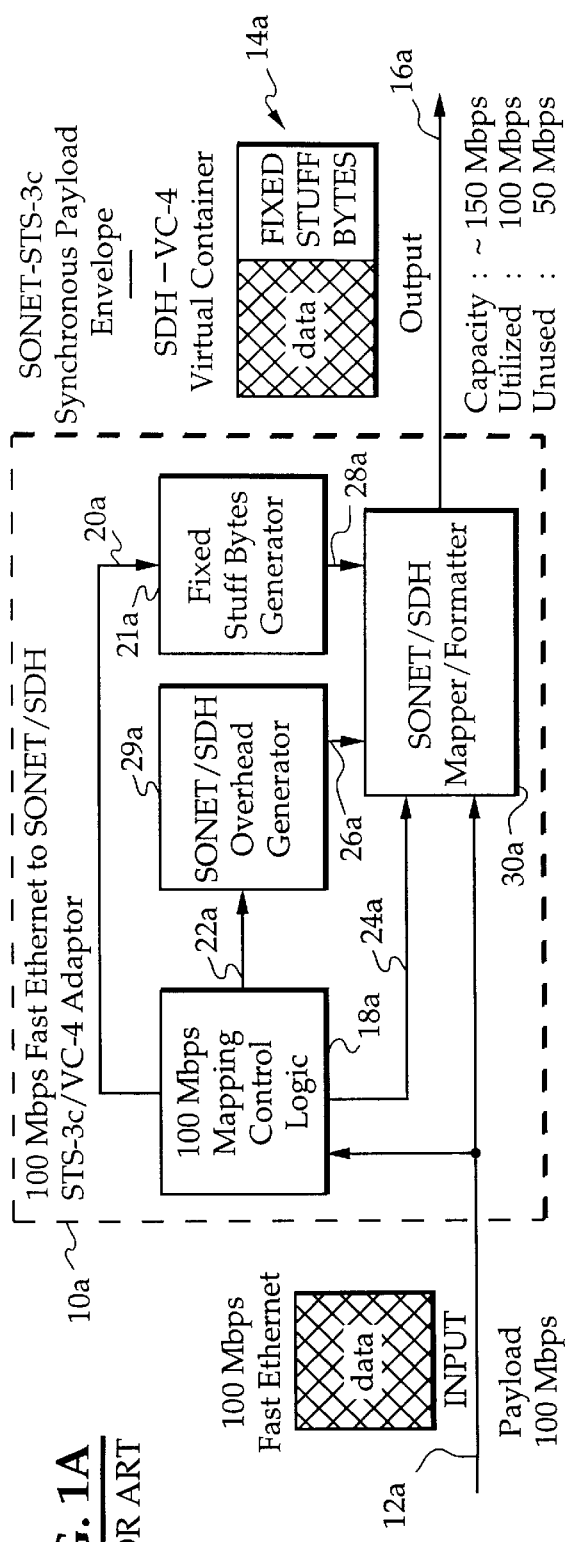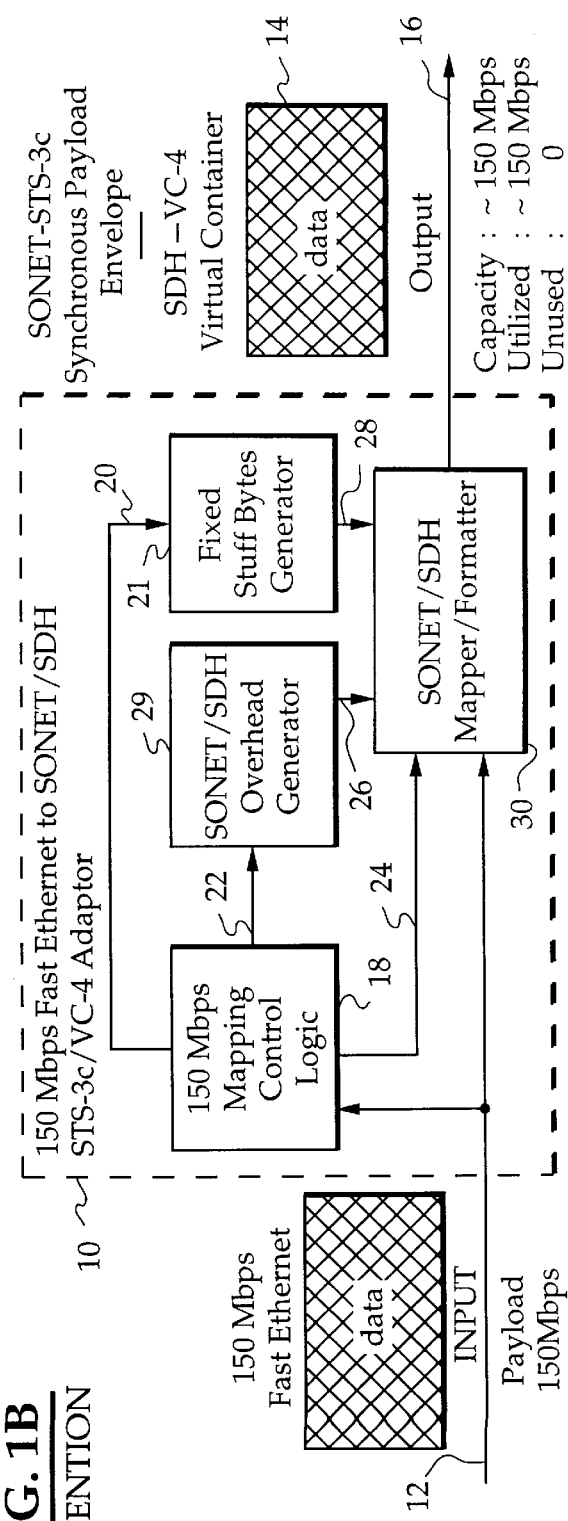

|   | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | H | A | A | A | A | A | A | A | A | A | A | A | A | A | A | A | A | A | A |
| 2 | H | A | A | A | A | A | A | A | A | A | A | A | A | A | A | A | A | A | A |
| 3 | H | A | A | A | A | A | A | A | A | A | A | A | A | A | A | A | A | A | A |
| 4 | H | A | A | A | A | A | A | A | A | A | A | A | A | A | A | A | A | A | A |
| 5 | H | A | A | A | A | A | A | A | A | A | A | A | A | A | A | A | A | A | A |
| 6 | H | A | A | A | A | A | A | A | A | A | A | A | A | A | A | A | A | A | A |
| 7 | H | A | A | A | A | A | A | A | A | A | A | A | A | A | A | A | A | A | A |
| 8 | H | A | A | A | A | A | A | A | A | A | A | A | A | A | A | A | A | A | A |
| 9 | H | A | A | A | A | A | A | A | A | A | A | A | A | A | A | A | A | A | A |

FIG. 2

Block Arrangement after mapping of 150 Mbps to STS-3C SPE
(Each cell of Fig. 2 = 13 bytes as shown in Figs. 3 & 4)

| X | I | I | I | I | I | I | I | I | I | I | I | I |
|---|---|---|---|---|---|---|---|---|---|---|---|---|

FIG. 3

"H" Block
(13 Bytes)

| I | I | I | I | I | I | I | I | I | I | I | I | I |
|---|---|---|---|---|---|---|---|---|---|---|---|---|

FIG. 4

"A" Block
(13 Bytes)

| i | i | i | i | i | i | i | i |
|---|---|---|---|---|---|---|---|

FIG. 5

"I" Byte
(i = data bit)

| o | o | o | o | o | o | o | o |
|---|---|---|---|---|---|---|---|

FIG. 6

"X" Byte
(o = overhead bit)

ADAPTOR AND METHOD FOR MAPPING A FAST ETHERNET PAYLOAD INPUT SIGNAL TO A SYNCHRONOUS PAYLOAD ENVELOPE, AS WELL AS A CLOCK SELECTOR FOR USE THEREWITH

BACKGROUND OF THE INVENTION

1. Technical Field of the Invention

The present invention relates to the 100 Base-T Fast Ethernet and, more particularly, to the transport of fast ethernet data on optical media according to the Synchronous Optical Network (SONET)/Synchronous Digital Hierarchy (SDH) standards.

2. Discussion of Related Art

The present international standard ISO/IEC 8802-3, corresponding to ANSI/IEEE Standard 802.3u-1995, provides a 100 Base-T, i.e., 100 Mbps, fast ethernet definition for Carrier Sense Multiple Access With Collision Detection (CSMA/CD) access method and physical layer specifications. The standard provides for the interface of the 100 Base-T fast ethernet with a SONET synchronous payload envelope (SPE) utilizing only two-thirds of the payload capacity thereof, thereby utilizing the transport capacity of the SONET SPE/SDH VC signal, specifically the SONET-STS-3c/SDH-VC-4, which operate at 155.520 Mbit/s (hereinafter "approximately 150 Mbps").

The synchronous optical network (SONET)/synchronous digital hierarchy (SDH) provides for various optical interface rates and formats, including super-rate services that require multiples of the basic STS-1 (for North America) rate that are mapped into an STS-Nc SPE and transported as a concatenated STS-Nc, whose constituent STS-1s are kept together. The STS-Nc is carried by an STS-M line signal, where M is greater than or equal to N. The STS-Nc is multiplexed, switched and transported through the network as a single entity. The STS-Nc consists of N×87 columns and 9 rows of bytes. The order of transmission is row-by-row from left to right, as shown in FIG. 27 of ANSI T1.105. Only one set of STS path overhead is required in the STS-Nc SPE. The STS-Nc SPE is carried within the STS-Nc such that the STS path overhead always appears in the first of the N STS-1s which make up the STS-Nc. For instance, an STS-3c SPE will include 3×87×9 bytes=2,349 bytes, of which 9 bytes are path overhead, and 2,340 bytes are payload capacity.

According to the above-mentioned international standard, the 100 Base-T fast ethernet, when transported on an optical network, inefficiently utilizes the transport capacity of the defined transport mechanisms. In the prior art, the unused capacity is filled with fixed stuff bytes.

SUMMARY OF THE INVENTION

It is an object of the present invention to provide a way to fully utilize the payload capacity of SONET synchronous payload envelope SPE/SDH virtual container (VC) when transporting fast ethernet.

According to a first aspect of the present invention, a rate for fast ethernet is defined to be the same or approximately the same as a corresponding SONET/SDH SPE/VC. Accordingly, an adaptor is defined for mapping such a fast ethernet payload input signal to an SPE/VC of a SONET/SDH output signal (e.g., STS-3c/VC-4) having a capacity of e.g., approximately 150 Megabits per second (Mbps). Such an adaptor comprises a mapping control logic means responsive to said input signal, for providing a fixed stuff byte control signal, an overhead control signal and a mapping/formatting control signal; a SONET/SDH overhead generator, responsive to said overhead control signal for providing an overhead signal; a fixed stuff byte generator, responsive to said fixed stuff byte control signal, for providing a stuff byte signal; and a SONET/SDH mapper/formatter, responsive to said fast ethernet payload input signal, said mapping/formatting control signal, said overhead signal and said stuff byte signal, for providing said fast ethernet payload input signal mapped to said SONET/SDH output signal. Although defined to have about the same rate as the SONET/SDH STS3c/VC-4 signal, it should be realized that the fast ethernet input signal could instead be defined to have a rate at some other increased level, i.e., greater than 100 Megabits per second, but not greater than the approximately 150 Mbps capacity of the SPE/VC of the SONET/SDH output signal.

According to a second aspect of the present invention, a method for mapping a fast ethernet payload input signal to a synchronous payload envelope (SPE)/virtual container (VC) of a synchronous optical network (SONET)/synchronous digital hierarchy (SDH) output signal (SDS-3c/VC-4) having a capacity of approximately 150 Megabits per second (Mbps), comprises the steps of receiving said fast ethernet data signal, providing said fast ethernet payload input signal in an output format, including a plurality of path overhead bytes and data bytes which altogether fill a frame of said STS-3c/VC-4 output signal having a capacity of approximately 150 Mbps.

According to a third aspect of the present invention, a fast ethernet adaptor comprises a signal processor, responsive to an input signal indicative of an incoming ethernet signal rate, for providing a selection signal, and a selector, responsive to said selection signal and to a plurality of clock signals, for selecting one of said plurality of clock signals having a signal rate corresponding to said incoming ethernet signal rate for providing said selected clock signal as an output signal.

These and other objects, features and advantages of the present invention will become more apparent in light of the detailed description of a best mode embodiment thereof, as illustrated in the accompanying drawing.

BRIEF DESCRIPTION OF THE DRAWING

FIG. 1A shows a prior art 100 Mbps Fast Ethernet to SONET/SDH STS-3c/VC-4 Adaptor.

FIG. 1B shows a 150 Mbps Fast Ethernet signal provided to SONET/SDH STS-3c/VC-4 Adaptor, according to the present invention.

FIG. 2 shows a block arrangement after mapping 150 Mbps to STS-3c SPE, where each cell of FIG. 2 includes thirteen bytes, as further defined in FIGS. 3 and 4.

FIG. 3 shows an "H" block of FIG. 2, with both "X" bytes as shown in FIG. 6 and "I" bytes as shown in FIG. 5.

FIG. 4 shows the details of an "A" block of FIG. 2 with 13 "I" bytes, as defined in FIG. 5.

FIG. 5 shows an "I" byte with exclusively data bits.

FIG. 6 shows an "X" byte with exclusively overhead bits.

DETAILED DESCRIPTION OF PREFERRED EMBODIMENTS

Figure 7:
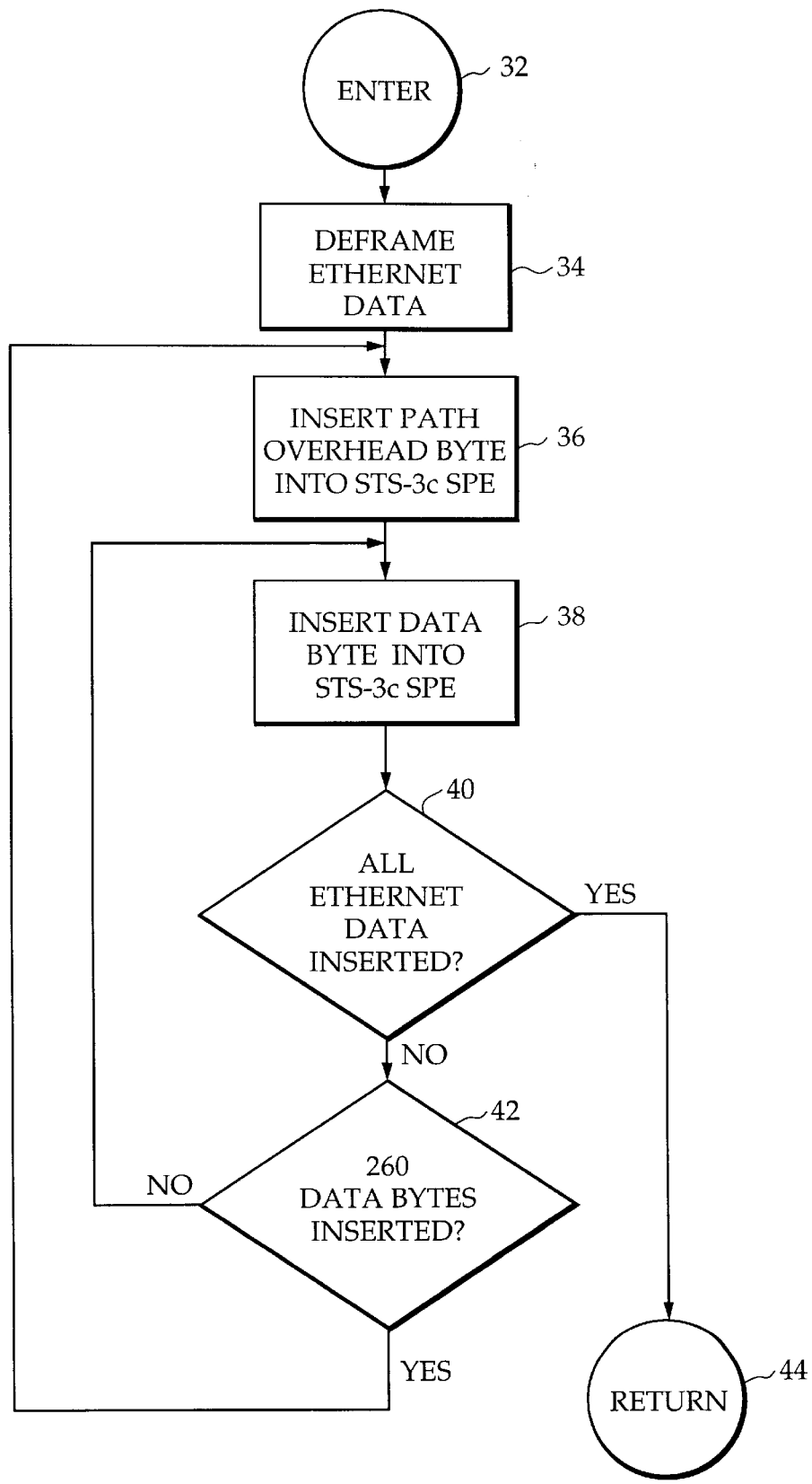
FIG. 7 shows a simplified flow chart for mapping the approximately 150 Mbps Fast Ethernet to a SONET STS-3c SPE.

FIG. 1A shows a prior art 100 Mbps Fast Ethernet to SONET/SDH STS-3c/VC-4 Adaptor 10a, according to the above-mentioned International Standard ISO/IEC 8802-3, corresponding to ANSI/IEEE Standard 802.3, for mapping a 100 Mbps fast ethernet data payload to a SONET STS-3c synchronous payload envelope (corresponding to an SDH VC-4 virtual container) wherein the approximately 150 Mbps capacity is under-utilized with approximately 50 Mbps bandwidth going unused by being filled up with fixed stuff bytes. In other words, a 100 Mbps Fast Ethernet input signal on a line 12a is input to the adaptor 10a for transport on a SONET STS-3c SPE (or an SDH VC-4 virtual container) on a line 16a, with one-third of its capacity wasted.

The adaptor 10a includes a 100 Mbps mapping control logic 18a responsive to the fast ethernet payload signal on the line 12a for providing a fixed stuff byte control signal on a line 20a, an overhead control signal on a line 22a, and a mapping/formatting control signal on a line 24a. A fixed stuff bytes generator 21a is responsive to the fixed stuff byte control signal on the line 20a for providing a stuff byte signal on a line 28a to a SONET/SDH mapper/formatter 30a. The mapper/formatter 30a is also responsive to an overhead signal on a line 26a from a SONET/SDH overhead generator 29a, which is in turn responsive to the overhead control signal on the line 22a.

As can be seen in the synchronous payload envelope/virtual container 14a of FIG. 1A, the capacity of the signal is only utilized to the extent of about 100 Mbps, with about 50 Mbps unused.

According to the present invention, as shown in FIG. 1B, the rate of the payload signal on the line 12 is increased to 150 Mbps, for example, in order to increase the amount of data transmitted per unit time by, e.g., 50 percent. In this way, the capacity of the synchronous payload envelope/virtual container 14 is substantially filled-up. In other words, the approximately 150 Mbps capacity of the STS-3c/VC-4 is almost completely utilized, with almost none of the capacity going unused. As can be seen within the modified adaptor 10 of FIG. 1B, now called a 150 Mbps fast ethernet adaptor, the mapping control logic is now responsive to a 150 Mbps payload signal on the line 12, rather than the merely 100 Mbps payload signal on the line 12a of FIG. 1A. Consequently, the mapping control logic 18 of FIG. 1B is designated as a 150 Mbps mapping control logic rather than merely a 100 Mbps mapping control logic 18a, such as shown in FIG. 1A. The other signals and blocks within the 150 Mbps fast ethernet adaptor 10 of FIG. 1B are analogous to those shown in FIG. 1A. In particular, however, the fixed stuff bytes generator 21 of FIG. 1B has only a very limited role, since only nine bytes of the STS-3c/VC-4 are unused, for the example as explained below in connection with FIG. 2.

FIG. 2 shows one possible structure for the signal on the line 16 of FIG. 1B. It represents a mapping of the 150 Mbps payload input on the line 12 by the mapper/formatter 30 in response to the signals on the lines 24, 26, 28 to an STS-3c SPE. There are nine rows and twenty columns of cells shown, for a total of 180 cells in FIG. 2. Each cell of FIG. 2 comprises 13 bytes, as shown in FIGS. 3 and 4. FIG. 3 shows an "H" block of 13 bytes, and FIG. 4 shows an "A" block of 13 bytes.

The "H" block of FIG. 3 includes one "X" byte and 12 "I" bytes, for a total of thirteen bytes. An "I" byte is illustrated in FIG. 5 as comprising eight bits of purely data bits, signified by the lower case letter "i". FIG. 6 shows the content of an "X" byte comprising eight bits of purely overhead bits, signified by the lower case letter "o".

As will be appreciated from the above-mentioned SONET standard, the STS-3c SPE consists of 3×87 columns and 9 rows of bytes, for a total of 2,349 bytes. The above mapping of FIG. 2 includes 9×20×13=2,340 bytes. Therefore, the STS-3c SPE is almost completely filled up, with only nine bytes remaining unused (for fixed stuff bytes) by this mapping of a 150 Mbps fast ethernet into a SONET STS-3c SPE. A nominal information rate will equal 149.184 Mbps, which is arrived at as follows:

(2340 bytes)(8 bits/byte)(8 kHz (SONET frame rate)). This figure represents the SPE minus the path overhead, the maximum data carrying capacity of the STS-3c signal. A similar situation will exist for the SDH VC-4.

FIG. 7 shows a method which may be carried out on the apparatus of FIG. 1B for mapping the 150 Mbps fast ethernet input data on the line 12 of FIG. 1B to a SONET STS-3c SPE output signal on the line 16, according to the mapping of FIGS. 2–6.

After entering in a step 32, a step 34 is executed to deframe the ethernet data. Once this is done, a step 36 inserts the path overhead byte ("X") of FIG. 6 into the first "H" block in the upper left-hand corner of FIG. 2. A step 38 then inserts an "I" byte, such as the second byte of the "H" block of FIG. 3. A decision step 40 then determines whether the entire STS-3c SPE of FIG. 2 has been filled up or not. If not, a decision step 42 is next executed to determine if the first row of FIG. 2 has been completed. It can do this by counting the number of data bytes inserted, in this case, 260 bytes per row (twenty cells times thirteen bytes per cell). If not, the steps 38, 40 and 42 are repeated, until step 42 determines that "Yes" the first row has been completed. In that case, the step 36 is next executed again to insert the overhead "X" byte of FIG. 6 at the beginning of the second row. The steps 38, 40, 42 are then repeated 259 times until all 260 bytes of row 2 have been inserted. At that point, step 36 is again executed for the third row, and so on, until a decision is finally made in step 40 that all 9 rows have been completed, and a return is then made in a step 44. It should be realized that the simplified flow chart of FIG. 7 is merely one way to carry out the mapping of FIG. 2, and furthermore, that the mapping of FIG. 2 is merely one way to carry out a method according to the present invention.

It should be realized that the adaptor of FIG. 1B can be reversed in function to be a receiver of a SONET STS-3c synchronous payload envelope with its capacity similarly more efficiently utilized. Such a signal would be similar to the output signal on the line 16 of FIG. 1B, except that it would be an input signal. In other words, referring to FIG. 8, the adaptor 10 of FIG. 1B is shown as a "fast ethernet transmitter" which forms a part of a 150 Mbps fast ethernet device 46, which also includes a "fast ethernet receiver" 48. The device 46 includes a 150 MHz clock which feeds both the transmitter 10 and receiver 48. A 150 Mbps ethernet control logic 52 includes the 150 Mbps mapping control logic 18 of FIG. 1B as well as the SONET/SDH overhead generator 29 and the fixed stuff bytes generator 21 (if applicable), as well as similar functional blocks for the receiver 48. In this way, a bidirectional adaptor device 46 is provided for interfacing between the SONET/SDH side and the 150 Mbps fast ethernet side.

Figure 8:
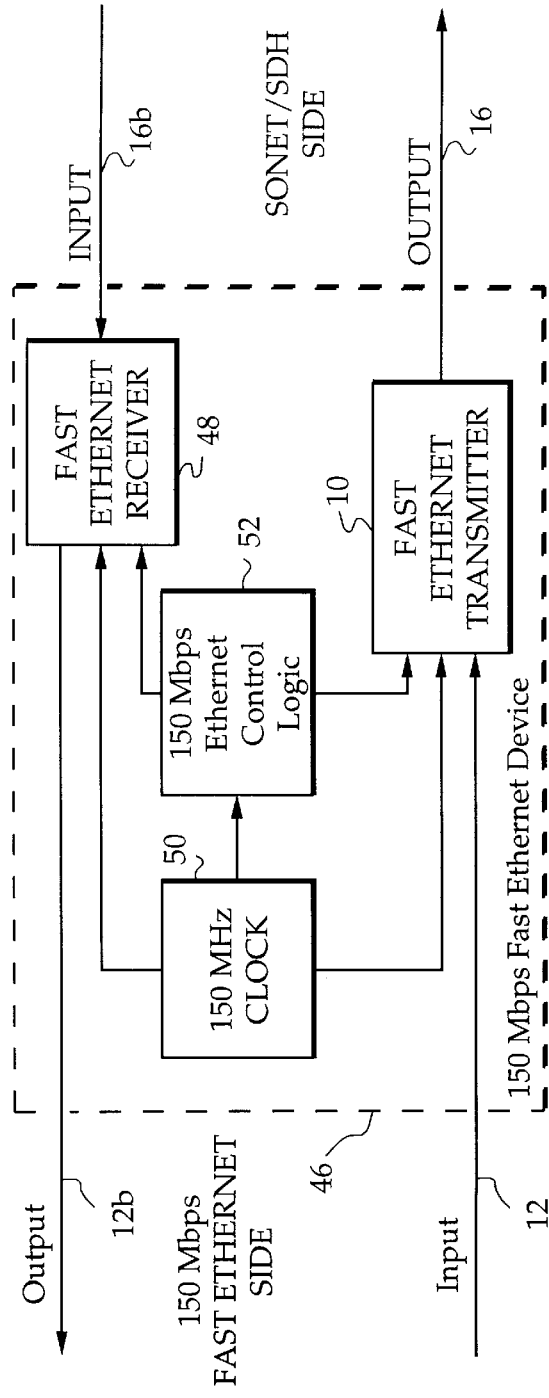
FIG. 8 shows a bidirectional device controller, according to the invention.

In further accord with the present invention, for example, in connection with a fast ethernet receiver such as the receiver 48 of FIG. 8, it is a further advantage to set up a device such as the receive interface 48 in such a way that it can receive a SONET/SDH STS-3c/VC-4 signal in either the format of the signal on the line 16a of FIG. 1A having only 100 Mbps capacity utilized, or a signal such as the signal on the line 16 of FIG. 1B having the signal capacity fully utilized. In that case, according to the invention, the receiving media downstream of the receiver 48 is made adaptable to either a 100 MHz clock or a 150 MHz clock. This could be done for a transmitter such as the device 10 of FIG. 8, as well as other devices which can be called "adapters" 54, as shown in FIG. 9.

Figure 9:
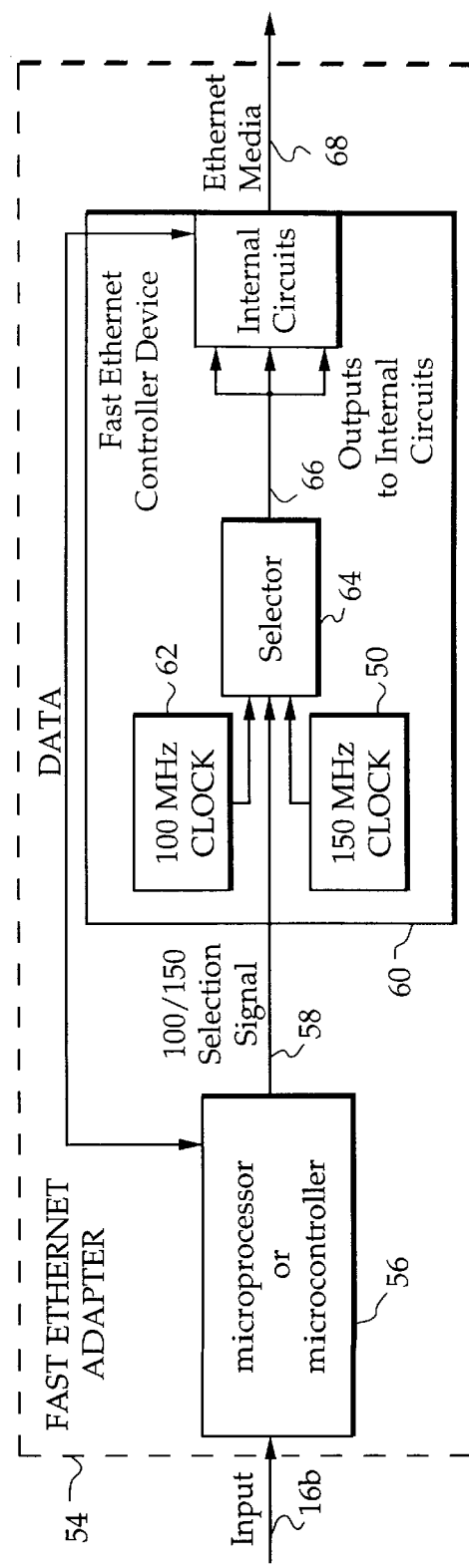
FIG. 9 shows a dual rate fast ethernet device, according to the present invention.

FIG. 9 shows such a fast ethernet adaptor 54 that is responsive to the input signal 16b, such as shown in FIG. 8. The adaptor 54 of this example would include the receiver 48 of FIG. 8 as well, although such is not shown in FIG. 9. A microprocessor or microcontroller 56 is responsive to the input signal on the line 16b. The device 56 may be within the receiver 48 of FIG. 8, or may itself constitute the receiver, with various functions including the functions shown in FIG. 8 for the receiver 48 and the function described in connection with FIG. 9.

In any event, the microprocessor 56 determines from the input signal on the line 16b whether the incoming signal is an under-utilized 150 Mbps signal, such as the signal on the line 16a of FIG. 1A, or is a more fully-utilized signal such as the signal on the line 16b of FIG. 1B. Once this determination is made, the microprocessor 56 outputs a 100/150 selection signal on a line 58 to a fast ethernet controller device 60. The device 60 includes both a 150 MHz clock 50, which may be the same as the 150 MHz clock of FIG. 8, and a 100 MHz clock 62. Both of these clocks provide clock output signals to a selector 64, which is also responsive to the 100/150 selection signal on the line 58. Depending on whether the input signal on the line 16b is fully utilized or under-utilized, the selection signal will select either the 150 MHz clock or the 100 MHz clock, respectively, and output the selected clock on a line 66, which can be split into various lines output to the various internal circuits on the 150 Mbps fast ethernet side of FIG. 8. An Ethernet Media output line 68 is shown, and this is symbolic of the data output on the line 12b of FIG. 8 for carrying (on the fast ethernet side) the data received from the SONET/SDH side.

The fast ethernet adaptor 54 of FIG. 9 thus provides a means for a customer to switch between the standard 100 Mbps fast ethernet and the above-described 150 Mbps fast ethernet. The basic idea is to provide an ethernet controller device, such as shown in FIG. 9, with the capability to run at both the standard 100 Mbps fast ethernet and at the 150 Mbps fast ethernet described above, and to provide for selection of the rate (mode) via a software-controlled input to provide a fast means for flexible customer reconfiguration of the device. This allows a single fast ethernet adaptor to be run at either rate at the customer's choosing, rather than having unique fast ethernet adaptors for each rate.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. An adaptor (10) for mapping a fast ethernet payload input signal (12) to a synchronous payload envelope (SPE)/virtual container (VC) (14) of a synchronous optical network (SONET)/synchronous digital hierarchy (SDH) output signal (STS-3c/VC-4) (16) having a capacity of approximately 150 Megabits per second (Mbps), comprising:

a mapping control logic means (18), responsive to said input signal, for providing a fixed stuff byte control signal (20), an overhead control signal (22) and a mapping/formatting control signal (24);

a SONET/SDH overhead generator, responsive to said overhead control signal for providing an overhead signal (26);

a fixed stuff byte generator, responsive to said fixed stuff byte control signal, for providing a stuff byte signal (28); and a SONET/SDH mapper/formatter (30), responsive to said fast ethernet payload input signal, said mapping/formatting control signal, said overhead signal and said stuff byte signal, for providing said fast ethernet payload input signal mapped to said SONET/SDH output signal, characterized in that said fast ethernet input signal has a rate greater than 100 Megabits per second but not greater than the approximately 150 Mbps capacity of the SPE/VC of said SONET/SDH output signal.

2. A method for mapping a fast ethernet payload input signal to a synchronous payload envelope (SPE)/virtual container (VC) of a synchronous optical network (SONET)/synchronous digital hierarchy (SDH) output signal (SDS-3C/VC-4) having a capacity of approximately 150 Megabits per second (Mbps), comprising the steps of:

receiving said fast ethernet data signal; and providing said fast ethernet payload input signal in an output format, including a plurality of path overhead bytes and data bytes which altogether fill a frame of said STS-3C/VC-4 output signal having a capacity of approximately 150 Mbps.

3. A fast ethernet adaptor, comprising:

a signal processor, responsive to an input signal indicative of an incoming ethernet signal rate for detecting said signal rate either at approximately 100 Mbps or 150 Mbps, for providing a selection signal; and a selector, responsive to said selection signal and to two clock signals at approximately 100 Mbps and 150 Mbps, for selecting one of said clock signals having a signal rate corresponding to said incoming ethernet signal rate for providing said selected clock signal as an output signal for use in mapping said input signal to a synchronous payload envelope (SPE)/virtual container (VC) (14) of a synchronous optical network (SONET)/synchronous digital hierarchy (SDH) output signal (STS-3c/VC-4) (16) having a capacity of approximately 150 Mbps.

* * * * *